3,248,320
ISOMERISATION OF PARAFFIN HYDROCARBONS
Peter Thomas White and David Lycett Knights, both of Sunbury-on-Thames, England, assignors to The British Petroleum Company Limited, London, England, a British joint-stock corporation
No Drawing. Filed Nov. 22, 1961, Ser. No. 154,342
Claims priority, application Great Britain Dec. 1, 1960
14 Claims. (Cl. 208—136)

This invention relates to the isomerisation of $C_4$ or higher paraffin hydrocarbons boiling in the gasoline range, i.e. up to 400° F. (204° C.), at temperatures of up to 400° F. (204° C.), and more particularly to the isomerisation of pentanes and/or hexanes. The term isomerisation includes both the conversion of normal paraffins to iso-paraffins and the conversion of iso-paraffins to iso-paraffins with a higher degree of branching.

Copending U.S. patent application Serial No. 135,425, filed September 1, 1961, is concerned with a process for the isomerisation of paraffin hydrocarbons using a catalyst prepared in a particular manner. It has now been found that, when using such an isomerisation process, a further benefit may be obtained by having hydrogen chloride present in the reaction zone.

According to the present invention a process for the isomerisation of $C_4$ and higher paraffin hydrocarbons boiling in the gasoline boiling range comprises contacting the paraffin hydrocarbons in the presence of hydrogen and a chlorine-containing material which is hydrogen chloride or a compound decomposable to hydrogen chloride under the isomerization conditions, at a temperature below 400° F. (204° C.) with a catalyst prepared by contacting alumina with a compound of general formula

where X, when a monovalent radical, is selected from the class consisting of H, Cl, Br and SCl, Y when a monovalent radical, is selected from the class consisting of H, Cl, Br and SCl, and where X and Y when they together form a divalent radical, is selected from the class consisting of O and S, under non-reducing conditions and at a temperature in the range of 149–593° C., such that chlorine is taken up by the alumina without the production of free aluminum chloride.

Preferably the alumina contains a minor proportion of a metal or metal compound having hydrogenating activity selected from Groups VIa or VIII of the Periodic Table. The preferred metal is a platinum group metal which may be present in an amount from 0.01 to 5% wt. and preferably 0.1 to 2% wt. The preferred platinum group metals are platinum and palladium, which have been found to be equivalent in effectiveness in low temperature isomerisation catalysts.

The feedstock of the process is preferably one containing a major proportion of pentanes, hexanes or a mixture of these paraffins. A feedstock containing a major proportion of hexanes is particularly preferred. If it is desired to isomerise normal paraffins only, the feedstock may first be treated to separate normal paraffins from the other hydrocarbons and the normal paraffins contacted with the isomerisation catalyst. Such separation may conveniently be effected by means of the so-called molecular sieves.

The product of the isomerisation reaction may similarly be treated to recover unconverted normal paraffins which may be re-cycled to the isomerisation reaction zone. Such separation may also conveniently be effected by means of the so-called molecular sieves.

The isomerisation may be carried out under the following conditions, in either liquid or vapour phase.

Temperature _____ 50–400° F., preferably 150–350.
Pressure _____ Atmospheric 2000 p.s.i.g., preferably 225–1000.
Space velocity _____ 0.05–10 v./v./hr., preferably 0–2.5.
Hydrogen:hydrocarbon mole ratio _____ 0.01–20:1, preferably 1.5–15:1.

The hydrogen chloride may be added to the reaction zone as such or in the form of a compound decomposable to hydrogen chloride under the isomerisation conditions. Thus, the chlorine-containing material may be, for example, one having chlorine combined with one or more of the elements, carbon, hydrogen or oxygen. Particularly preferred compounds are chloro-substituted derivatives of hydrocarbons, for example, chloro-substituted derivatives of $C_1$–$C_4$ aliphatic hydrocarbons. Specific examples of suitable compounds are carbon tetrachloride, chloroform, methylene chloride, and tertiary butyl chloride, the first-mentioned of these being particularly suitable. Although certain of the compounds mentioned are also suitable for use in the preparation of the catalyst, the mechanism by which a further improvement in the process is obtained is not connected with the formation of active catalyst material in situ in the reaction zone, since active catalysts cannot be prepared in the presence of hydrogen.

The hydrogen chloride or chlorine compound may be added to the reaction zone in any convenient manner, for example by direct injection, by addition to the recycle gas, or, preferably, by addition to the feedstock.

The amount of hydrogen chloride or decomposable chloride added may conveniently be within the range 0.01 to 5% wt. of chlorine by weight of feedstock, the precise amount depending on the result required. In general, increase in the amount added increases the isomerisation obtained, but this may be subject to consequent alteration of other process conditions. For example, when, as is customary, a system of hydrogen recycle is used it has been found that a considerable quantity of hydrogen chloride is present in the recycle gas and that this amount increases with increasing addition of chlorine to the reaction zone. The presence of hydrogen chloride in the recycle gas affects the hydrogen:hydrocarbon mole ratio and it may be desirable, therefore, to adjust the conditions to maintain the hydrogen partial pressure. It has also been found that the improvement obtained by increasing the amount of chloride added persists even after the amount added has been subsequently reduced. This is again considered to be due to the fact that hydrogen chloride is recycled with the hydrogen and it may be possible to maintain any desired improvement with periodic or varying addition of chlorine. A certain amount of hydrogen chloride also dissolves in the product under the isomerisation conditions and it may be possible to recover and reuse this if desired.

A further advantage of the addition of chloride is that the tolerance of the catalyst to aromatic hydrocarbons is increased, and the feedstock may contain up to 0.5% wt. of aromatics. The feedstock may also contain significant amounts of olefins, for example up to 1% wt., without appreciable loss of catalyst activity.

However, it is desirable to keep the aromatic content of the feedstock as low as practicable and the feedstock is also advantageously free of sulphur and water.

It also has, desirably, a low content of naphthenic hydrocarbons. Suitable methods of pretreating feedstocks for an isomerisation process using a catalyst of an aluminum halide and a hydrogenating metal supported on a refractory oxide are described and claimed in copending U.S. patent applications Serial No. 51,302, filed August 23, 1950, and Serial No. 80,519, filed January 4, 1961; both now abandoned. The methods described therein may also be used with the isomerisation process of the present invention.

The method of preparing catalysts for use in the isomerisation process of the present invention is described and claimed in copending U.S. patent application Serial No. 135,426, filed September 1, 1961.

A particular feature of the catalyst preparation is the use of the specific compounds of the general formula indicated, these compounds giving a specific form of chlorination which produces active low temperature isomerisation catalysts. The following examples of compounds giving active and inactive catalysts respectively illustrate the specific nature of the compounds used.

Compounds giving active catalysts:
    Carbon tetrachloride ($CCl_4$)
    Chloroform ($CHCl_3$)
    Methylene chloride ($CH_2Cl_2$)
    Trichlorobromomethane ($CCl_3Br$)
    Thiocarbonyltetrachloride ($CCl_3SCl$)

Compounds giving inactive catalysts:
    Hydrogen chloride (HCl)
    Chlorine ($Cl_2$)
    Methyl chloride ($CH_3Cl$)
    Acetyl chloride ($CH_3COCl$)
    Dichloroethane ($CH_2Cl—CH_2Cl$)
    Tetrachloroethane ($CHCl_2—CHCl_2$)
    Tetrachloroethylene ($CCl_2=CCl$ In the case of compounds containing elements other than chlorine, carbon and hydrogen, the treatment may add the other elements to the catalyst in addition to the chlorine. It has been found, however, that catalysts so prepared are still active for low temperature isomerization, and they may have, in addition, other properties resulting from the addition of the other elements. It has also been found that small amounts of halogens (including chlorine) which may be present in the alumina prior to the chlorination treatment of the present invention do not affect the activity of the catalysts for low temperature isomerisation although this halogen does not contribute in any way to the isomerisation activity. Thus, the alumina used may already contain up to 2% wt. of chlorine and/or fluorine, as when, for example, the material which is chlorinated by the process of the present invention is a catalyst normally used for the reforming of gasoline boiling range hydrocarbons. The preferred compounds giving active catalysts are carbon tetrachloride, chloroform and methylene chloride.

The compounds covered by the general formula in which X and Y together are O or S are phosgene and thiophosgene.

Any convenient form of alumina may be used which contains hydrogen. This is a characteristic of activated aluminas which, although predominantly alumina, do contain a small amount of hydrogen, usually less than 1% wt. This hydrogen is generally considered to be in the form of surface hydroxyl groups, and it is believed that the chlorine compounds react with the surface hydroxyl groups to form the active catalyst sites. Water is, in fact, a product of the reaction, but not all the hydrogen is removed and the treated catalyst still contains a measurable quantity of hydrogen. The amount of chlorine added to the catalyst is preferably within the range 1 to 15% wt. the precise amount being dependent on the surface area as measured by low temperature nitrogen absorption. It has been found that the maximum amount of chlorine which can be added without the formation of free aluminum chloride is related to the surface area and is about $3.0—3.5 \times 10^{-4}$ g./m.$_2$. Maximum chlorination is preferred, but lower amounts of chlorine still give active catalysts and a suitable range is, therefore, from $2.0 \times 10^{-4}$ to $3.5 \times 10^{-4}$ g./m.$^2$.

Any of the forms of alumina suitable as a base for reforming catalysts bay be used, but a particularly preferred form is one derived from an alumina hydrate precursor in which the trihydrate predominates. One containing a major proportion of β-alumina trihydrate is particularly suitable. A convenient method of preparing the alumina is by hydrolysis of an aluminium alcoholate, for example aluminium isoperoxide, in an inert hydrocarbon solvent, for example, benzene. Other things being equal, the greater the amount of chlorine taken up by the alumina, the greater the activity of the catalyst and since, as stated above, the maximum amount of chlorine which can be related to the surface area, it is desirable that the alumina should have a high surface area, for example more than 250 m.$^2$/g. and preferably more than 300 m.$^2$/g.

If desired there may be admixed with the alumina a minor proportion of one or more other refractory oxide selected from Groups II to V of the Periodic Table. Thus the alumina may contain up to 50% wt. of, for example, silica, titania, beryllia, zirconia or magnesia.

The hydrogenating metal is desirably incorporated with the alumina prior to the treatment with the chlorine. When using a platinum group metal it is also desirable that it should be finely dispersed as small crystallites on the alumina, suitable criteria for the size of the crystallites being that they are not detectable by X-ray diffraction and that on treatment of the platinum group metal-alumina composite with benzene at 250° C. they have a measurable chemisorption, preferably not less than 0.1 molecule of benzene absorbed/atom of platinum and not less than 0.03 molecule of benzene absorbed/atom of palladium. Details of the benzene chemisorption technique have been published in "Actes du Deuxieme Congres International de Catalyse," Paris, 1960, vol. 2, page 1851.

A convenient method of obtaining the platinum group metail in the required state of sub-division is to add a solution of a platinum group metal compound to a hydrogel of the alumina and to precipitate the platinum group metal as a sulphide, for example by treatment with hydrogen sulphide. The treatment of the platinum group metal-alumina composite with the chlorine compound is preferably given with the platinum group metal in a reduced state, and this can conveniently be achieved by pre-treating the composite with hydrogen. When a platinum group metal-alumina composite is treated with a chlorine compound according to the present invention it is believed that a portion of the chlorine taken up is associated with the platinum group metal as an active complex.

In some cases, the presence of active complexes in the catalysts can be demonstrated by the development of intense colours (orange-yellow) on treatment with dry benzene.

An alumina only (after carbon tetrachloride treatment) gives a yellow colour with benzene but this does not persist on flushing with dry nitrogen.

The platinum-on-alumina (after treatment with carbon tetrachloride) however gives a stable yellow colour with benzene and can be stored under dry nitrogen indefinitely.

The non-reducing conditions used for the chlorination may be either inert or oxidising conditions, the latter being preferred since they give catalysts which lose activity more slowly during low temperature isomerisation. A convenient method of contacting the alumina is to pass a gaseous stream of the chlorine compound over the alumina either alone or, preferably, in a non-reducing carrier gas. Examples of suitable carrier gases are nitrogen, air or oxygen.

Non-reducing conditions are essential, since reducing conditions tend to convert the chloride compound to hydrogen chloride, which gives an inactive catalyst. The temperature for the chlorination may be from 300–1100° F. (149–593° C.). The tendency to form free aluminium chloride increases with temperature and care should, therefore, be exercised when using the higher temperatures within the stated range. Since the temperatures used will normally be above the volatilisation temperature of aluminium chloride the formation of free aluminum chloride is readily detected by its appearance in the gaseous reaction products. When treating a platinum group metal-alumina composite, care should also be exercised to prevent the formation of volatile platinum complexes the tendency for the formation of such complexes again increasing with increasing temperature. When treating platinum group metal-alumina composites the temperature is preferably 300–700° F. (149–371° C.), platinum-on-alumina composites being more particularly treated at 450–600° F. (232–316° C.) and palladium-alumina composites at 500–650° F. (260–343° C.). The chlorination reaction is exothermic and the temperatures specified are the initial temperatures used.

The rate of addition of the chlorine compound is preferably as low as practicable to ensure uniform chlorination and to avoid a rapid increase of temperature as a result of the exothermic reaction. Preferably the addition rate does not exceed 1.3% wt. of chlorine compound by weight of catalyst per minute. If a carrier gas is used the rate of flow is preferably at least 200 volumes/volume of catalyst/hour and a convenient range is 200–1000 v./v./hr. The pressure used is conveniently atmospheric.

The active catalyst is susceptible to hydrolysis in the presence of water and should, therefore, be stored under anhydrous conditions. Similarly the materials used in the catalyst preparation should also be free from water.

The use of the catalysts for low temperature isomerisation according to the present invention, and their preparation is illustrated by the following examples.

EXAMPLE 1

Catalyst preparation 70 ml. of a commercial platinum-alumina composite comprising 0.57 percent weight platinum and 0.81 percent chlorine on alumina were placed in a vertical reactor and a stream of dry nitrogen was passed downflow through the reactor. The reactor was operated at atmospheric pressure and the nitrogen flow rate was set at 200 volumes gas per volume of catalyst per hour.

The catalyst temperature was quickly raised to and maintained at 300° C. and the catalyst was flushed with nitrogen for 12 hours.

10 ml. (16 g.) of dry carbon tetrachloride were then added dropwise to the gas stream above the catalyst bed, while the temperature was maintained at 300° C. The time taken to add the carbon tetrachloride was 20 minutes.

The catalyst was finally flushed with dry nitrogen gas at the same flow rate, and at a temperature of 300° C., for 1 hour.

Activity test

The reactor was operated under single pass, downward flow conditions. The feedstock was a dry, desulphurised, dearomatised hexane cut from a $C_5/C_6$ light gasoline. As indicated in the following table for certain test periods the feedstock contained one percent weight carbon tetrachloride.

Details of the processing conditions employed and gas chromatographic analyses of the feedstock and test period products are given in the following table:

| | | | | | |
|---|---|---|---|---|---|
| Temperature, °F | | | 270 | 270 | 270 | 300 |
| Pressure, p.s.i.g | | | 250 | 250 | 250 | 250 |
| Hydrogen:Hydrocarbon, mole ratio | | | 2.4:1 | 2.7:1 | 2.5:1 | 2.4:1 |
| Liquid hourly space velocity, v./v./hr | | | 0.5 | 1.0 | 1.0 | 2.0 |
| Hours on stream | | Feed | 37–40 | 45–48 | 60–63 | 86–89 |
| $CCl_4$ in feed, percent wt | | | None | None | 1.0 | 1.0 |
| Composition, percent wt.: | | | | | | |
| $C_1$–$C_5$ paraffins | | 3.5 | 2.5 | 2.0 | 2.5 | 4.0 |
| $C_6$ paraffins | | 89.5 | 89.5 | 88.0 | 91.0 | 89.5 |
| $C_6$ naphthenes | | 8.5 | 8.0 | 10.0 | 6.5 | 6.5 |
| Total | | 100 | 100 | 100 | 100 | 100 |
| $C_6$ paraffin fraction, percent wt.: | | | | | | |
| 2,2-dimethylbutane | | 1.0 | 28.0 | 21.0 | 26.5 | 19.5 |
| 2,3-dimethylbutane | | | | | | |
| 2-methylpentane | | 39.0 | 40.0 | 43.0 | 42.5 | 42.5 |
| Cyclopentane | | | | | | |
| 3-methylpentane | | 22.0 | 19.0 | 20.5 | 18.5 | 21.0 |
| n-Hexane | | 38.0 | 13.0 | 15.5 | 12.5 | 17.0 |
| Total | | 100 | 100 | 100 | 100 | 100 |

The table shows that, at a given space velocity, the addition of carbon tetrachloride gives a considerably increased yield of 2,2-dimethylbutane, and that it is possible to increase the space velocity without appreciably affecting the yield.

EXAMPLE 2

Preparation of catalysts

Four equal quantities of a platinum-alumina composite, consisting of 0.57 percent weight platinum and 0.81% wt. chlorine on alumina in the form of 1/16 inch extrudates, were placed in vertical glass reactors. A gas flow equivalent to an hourly space velocity of 500 v./v./hr. was established in a downward direction through each reactor, while the catalyst temperature was raised to the desired value. Where hydrogen pretreatment was employed, the catalyst temperature was raised under nitrogen flow and a nitrogen purge followed the hydrogen treatment. After pretreatment the catalyst were treated with carbon tetrachloride which was added dropwise into the carrier gas stream above the catalyst bed. The carrier gas flow and initial catalyst treatment temperature were the same as for pretreatment. The addition rate of carbon tetrachloride was not allowed to exceed 0.8 g. $CCl_4$/min.

Details of the treatment conditions for the four catalysts and the respective carrier gases employed are given in the table below:

| Catalyst | A | B | C | D |
|---|---|---|---|---|
| Type of carrier gas pretreatment | Nitrogen | Air | Hydrogen | Hydrogen |
| $CCl_4$ treatment | Nitrogen | Air | Nitrogen | Air |
| Treatment temperature, °F | 500 | 500 | 500 | 500 |
| Carrier gas flow, v./v./hr | 500 | 500 | 500 | 500 |
| $CCl_4$ added, percent wt | 25 | 25 | 37 | 32 |
| Catalyst chlorine content, percent wt. | 11.85 | 11.2 | 12.15 | 11.4 |
| Efficiency of chlorination, percent | 51 | 49 | 36 | 38 |

Catalyst activity tests

The four catalysts described above were examined for the low temperature isomerisation of hexane. The feedstock was a desulphurised, dearomatised $C_6$ cut from a refinery light gasoline and contained 90 percent hexanes and 10 percent weight $C_6$ naphthenes. Prior to processing, 0.1 percent weight carbon tetrachloride was added to the feedstock.

The activity test conditions, and other test data, for each of the catalysts are given below:

| Catalyst | A | B | C | D |
| --- | --- | --- | --- | --- |
| ACTIVITY TEST CONDITIONS | | | | |
| Temperature, °F | 270 | 270 | 270 | 270 |
| Pressure, p.s.i.g | 250 | 250 | 250 | 250 |
| Hydrogen: hydrocarbon, mol ratio | 2.5:1 | 2.5:1 | 2.5:1 | 2.5:1 |
| Liquid hourly space velocity, v./v./hr | 2.0 | 2.0 | 2.0 | 2.0 |
| ACTIVITY TEST RESULTS | | | | |
| Conversion at 20 HOS percent wt. 2,2-dimethylbutane [1] | 19 | 20 | 15 | 21 |
| Conversion at 70 HOS percent wt. 2,2-dimethylbutane | 14 | 16 | ------ | ------ |
| Feedstock CCl$_4$ content, percent wt | 0.1 | 0.1 | 0.1 | 0.1 |
| Fresh chlorine content, percent wt | 11.85 | 11.2 | 12.5 | 11.4 |
| Spent chlorine content, percent wt | 10.4 | 10.25 | 10.65 | 9.9 |
| Feed processed, kg | 2.62 | 2.70 | 1.91 | 1.55 |
| Catalyst chlorine lost, a Cl/kg. feed | 0.14 | 0.09 | 0.21 | 0.26 |

[1] Catalyst Activity is measured by the percent weight 2,2-dimethylbutane content of the unstabilised liquid product at a given hours on stream.

EXAMPLE 3

This example shows the effect of different amounts of chlorine on the composition of the recycle gas and the catalyst activity.

Catalyst preparation 70 ml. (54 g.) of a platinum-alumina composite, consisting of 0.57 percent weight platinum and 0.81% wt. chlorine on alumina in the form of $\frac{1}{16}$ inch extrudates, were treated in the following manner:

a. The composite was dried for 16 hours at 500° F. in a 500 v./v./hr. flow of nitrogen.

b. The composite was reduced in hydrogen for 2 hours under similar temperature and gas flow conditons.

c. The hydrogen was cleared from the system by nitrogen purge.

d. The composite was then treated with 25 g. of carbon tetrachloride over 2 hours using 500 v.v./hr. flow of air as carried gas, the air being bubbled through a carbon tetrachloride saturater. The initial temperature of the composite was 500° F., and the CCl$_4$ treatment caused a rise in temperature of 40° F. At the end of 2 hours, 5.6 g. of CCl$_4$ had been recovered from the effluent gases, and hence the net CCl$_4$ treatment was 36% wt.

e. When the CCl$_4$ treatment was stopped, the catalyst temperature was raised in 100° F. stages to 900° F. under a 500 v.v./hr. air flow. After 2 hours air treatment at 900° F., the catalyst was cooled to 270° F. under air flow.

Activity test

The process conditions used were 270° F., 250 p.s.i.g. (hydrogen), 2.5:1 H$_2$:HC mol ratio, 1.0 v.v./hr. feed space velocity vapour phase operation.

Hydrogen gas recycle was employed, samples of equilibrium recycle gas being taken at each level of CCl$_4$ feedstock additive. A "chlorine balance" was taken at each CCl$_4$ level, the results being given below together with the once through conversions to 2,2-dimethylbutane.

These figures show an almost linear relationship between CCl$_4$ level in the feedstock and the molar concentration of HCl in the recycle gas. The chlorine contents of the product show that, in all cases, over 80% wt. of the CCl$_4$ is converted to HCl (inorganic Cl) but the level of unconverted CCl$_4$ (organic Cl) rises with increase in CCl$_4$ input.

The equilibrium recycle gas analyses show how alteration in recycle rate would be necessary to maintain a constant hydrogen partial pressure.

EXAMPLE 4

This example shows the effect of chlorine addition when the feedstock contains aromatics or olefins.

The catalyst and process conditions were the same as in Example 3 except that in the case of the aromatic containing feedstock the space velocity was 2 v./v./hr.

The following table gives the results with an aromatic-containing feedstock, and shows that the drop in activity when benzene is present in the feedstock is markedly reduced when carbon tetrachloride is added.

| CCl$_4$ added, percent wt. | Benzene in feedstock, percent wt. | Conversion to 2,2-dimethylbutane | |
| --- | --- | --- | --- |
| | | Initial | At 20 HOS |
| Nil | Nil | 19 | 18 |
| Nil | 1.0 | 11 | 8 |
| 0.1 | Nil | 19 | 19 |
| 0.1 | 1.0 | 17 | 16 |

The following table gives the results with an olefin containing feed, and shows that up to 1% wt. of hexene-1 in the feedstock can be tolerated without appreciable loss of catalyst activity when carbon tetrachloride is added.

| CCl$_4$ in feed, percent wt. | Hexene-1 in in feed, percent wt. | Feed Bromine No. | HOS | Conversions, percent wt. 22 DMB |
| --- | --- | --- | --- | --- |
| 0.1 | Nil | 0.14 | 0.40 | 28 |
| 0.1 | 0.5 | 0.86 | 40–100 | 28 |
| 0.1 | 1.0 | -------- | 100–140 | 26 |

We claim:

1. A process for the isomerization of C$_4$ and higher parafin hydrocarbons boiling in the gasoline boiling range comprising contacting the paraffin hydrocarbons in the presence of hydrogen and a chlorine-containing material which is selected from the class consisting of hydrogen chloride and compounds decomposable to hydrogen chloride under the isomerisation conditions, at a temperature below 400° F. (204° C.) with a catalyst prepared by contacting alumina containing 0.01 to 5% by wt. of a metal having hydrogenating activity selected from the Groups VIa and VIII of the Periodic Table with a compound of general formula

where X, when a monovalent radical, is selected from the class consisting of H, Cl, Br and SCl, Y when a mono-

| IN | | Equilibrium recycle gas | | | | OUT | |
| --- | --- | --- | --- | --- | --- | --- | --- |
| Cl, percent wt. (as CCl$_4$) | Once through conversion to 2,2-dimethyl butane | HCl, percent mol | HCl, percent wt. | H$_2$:HC mole ratio | Hydrogen partial pressure p.s.i.a. | Cl, percent wt. (inorganic) | Cl, percent wt. (organic) |
| 0.46 | 25 | 2 | 27 | 2.45:1 | 188 | 0.4 | 0.025 |
| 0.92 | 29 | 4 | 43 | 2.4:1 | 187 | 0.77 | 0.075 |
| 1.84 | 26.5 | 7.5 | 60 | 2.32:1 | 185 | 1.5 | ---------- | valent radical, is selected from the class consisting of H, Cl, Br and SCl, and where X and Y when they together form a divalent radical, is selected from the class consisting of O and S, under non-reducing conditions and at a temperature in the range of 149–593° C., such that chlorine is taken up by the alumina without the production of free aluminum chloride, said catalyst containing from $2.0 \times 10^{-4}$ to $3.5 \times 10^{-4}$ g. of chlorine/sq. meter of surface area.

2. A process as claimed in claim 1 wherein the chlorine-containing material is a compound of chlorine combined with at least one of the elements carbon, hydrogen and oxygen.

3. A process as claimed in claim 2 wherein the chlorine containing material is a chloro-substituted derivative of a hydrocarbon.

4. A process as claimed in claim 1 wherein the hydrocarbon is a $C_1$–$C_4$ aliphatic hydrocarbon.

5. A process as claimed in claim 4 wherein the chlorine-containing material is carbon tetrachloride.

6. A process as claimed in claim 1 wherein the chlorine-containing material is added to the feedstock.

7. A process as claimed in claim 1 wherein the isomerisation temperature is from 10 to 204° C.

8. A process as claimed in claim 7 wherein the isomerisation temperature is from 65 to 197° C.

9. A process as claimed in claim 1 wherein the isomerisation pressure is from atmospheric to 2000 p.s.i.g., the space velocity from 0.5 to 10 v/v./hr. and the hydrogen:hydrocarbon mole ratio from 0.01 to 20:1.

10. A process as claimed in claim 9 wherein the isomerisation pressure is from 225 to 1000 p.s.i.g., the space velocity from 0.2 to 5 v./v./hr. and the hydrogen-hydrocarbon mole ratio from 1.5 to 15:1.

11. A process as claimed in claim 1 wherein the hydrogenating metal is platinum.

12. A process as claimed in claim 1 wherein the hydrogenating metal is palladium.

13. A process as claimed in claim 1 wherein the amount of hydrogenating metal is from 0.1 to 2% wt.

14. A process as claimed in claim 1 wherein the catalyst contains from 1 to 15% wt. of chlorine.

References Cited by the Examiner
UNITED STATES PATENTS

| | | | |
|---|---|---|---|
| 2,220,090 | 11/1940 | Evering et al. | 208—135 |
| 2,530,874 | 11/1950 | Gwyn et al. | 252—442 |
| 2,642,384 | 6/1953 | Cox | 208—139 |
| 2,789,105 | 7/1957 | Heinemann et al. | 260—683.65 |
| 2,916,440 | 12/1959 | Hogin | 208—139 |
| 2,929,772 | 3/1960 | Gilmore | 208—139 |
| 2,938,851 | 5/1960 | Stedman et al. | 208—139 |
| 2,966,528 | 12/1960 | Haensel | 260—666 |
| 3,105,859 | 10/1963 | Fogle et al. | 260—683.65 |

DELBERT E. GANTZ, *Primary Examiner.*

ALPHONSO D. SULLIVAN, J. R. LIBERMAN,
*Examiners.*